United States Patent

Huang

[11] Patent Number: 5,865,447
[45] Date of Patent: Feb. 2, 1999

[54] CONTROLLING STRUCTURE OF A STROLLER

[76] Inventor: Li-chu Chen Huang, No. 99, Fuchou 7th St., Chiayi City, Taiwan

[21] Appl. No.: 819,387
[22] Filed: Mar. 17, 1997
[51] Int. Cl.⁶ .................. B62B 1/04; A47C 1/00
[52] U.S. Cl. .................. 280/30; 280/648; 297/256.16
[58] Field of Search ............. 280/30, 643, 648, 280/47.371; 297/256.16, 130

[56] References Cited

U.S. PATENT DOCUMENTS

| | | | |
|---|---|---|---|
| 4,915,401 | 4/1990 | Severson et al. | 280/30 |
| 5,133,567 | 7/1992 | Owens | 280/47.371 |
| 5,277,472 | 1/1994 | Freese et al. | 297/130 |
| 5,564,778 | 10/1996 | Shimer et al. | 297/130 |
| 5,644,816 | 7/1997 | Chou | 280/47.371 |
| 5,676,386 | 10/1997 | Huang | 280/30 |
| 5,772,279 | 6/1998 | Johnson, Jr. | 297/130 |

*Primary Examiner*—Brian L. Johnson
*Assistant Examiner*—Jason S. Brooks
*Attorney, Agent, or Firm*—Michaelson & Wallace; Peter L. Michaelson; John C. Pokotylo

[57] ABSTRACT

A controlling structure of a stroller enabling a user to release a seat includes a driving block and a driven block respectively engaged with each other through respective teeth integrally formed on a respective upper end face and a respective lower end thereof and a wire having a first end thereof securely connected with a control bar and a second end thereof securely connected with the driving block such that when a user pulls the control bar, the driving block will move along in the same direction as the control bar, and the driven block will thus be forced to move sideward. When the driven block is moved sideward, a projection of the driven block originally received within a side hole of an armrest will also be moved out of the side hole. Thus, a seat having a hole defined in respective side thereof and initially having the projection of the driven block received within the hole is able to be lifted by a user.

4 Claims, 8 Drawing Sheets

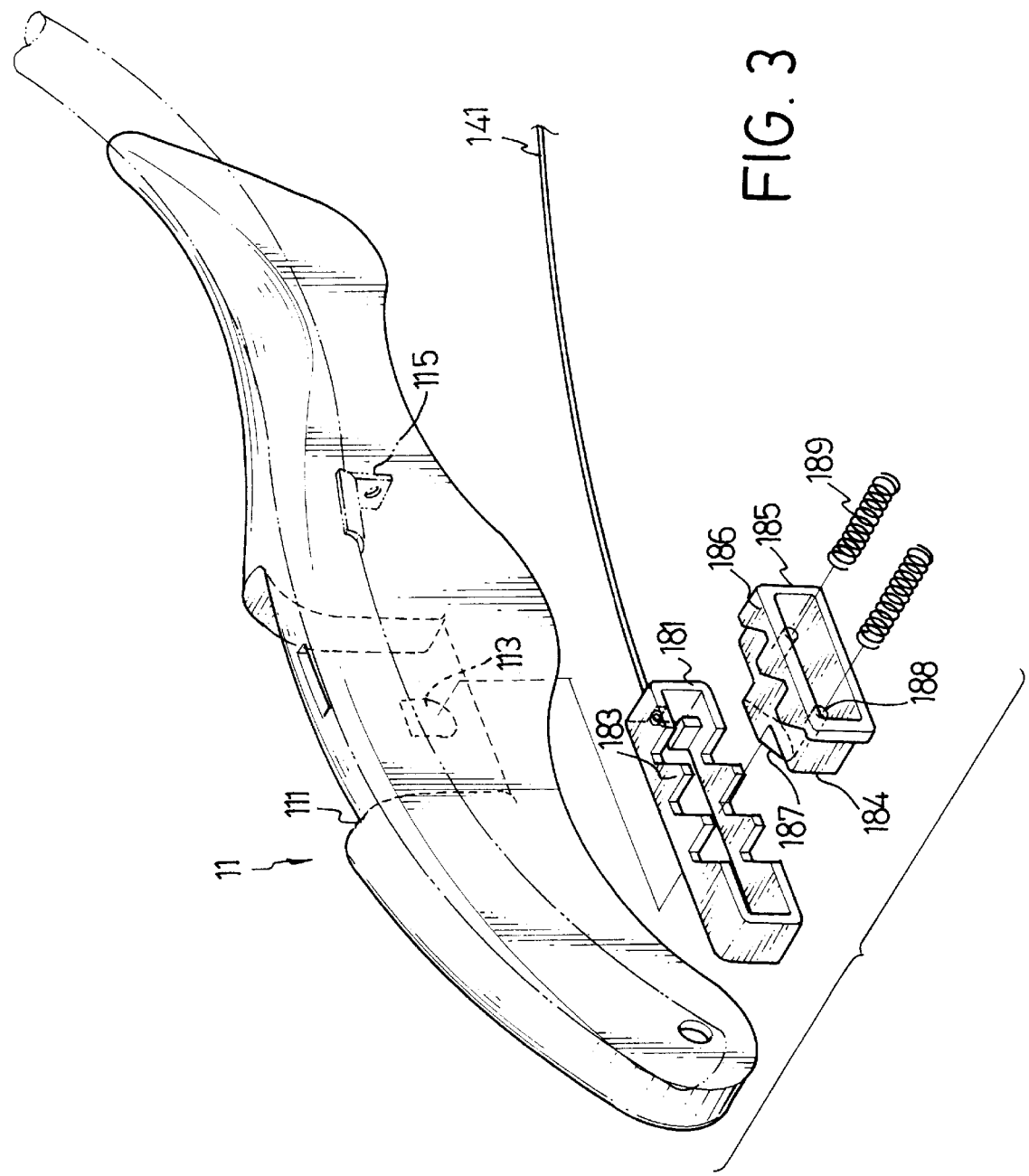

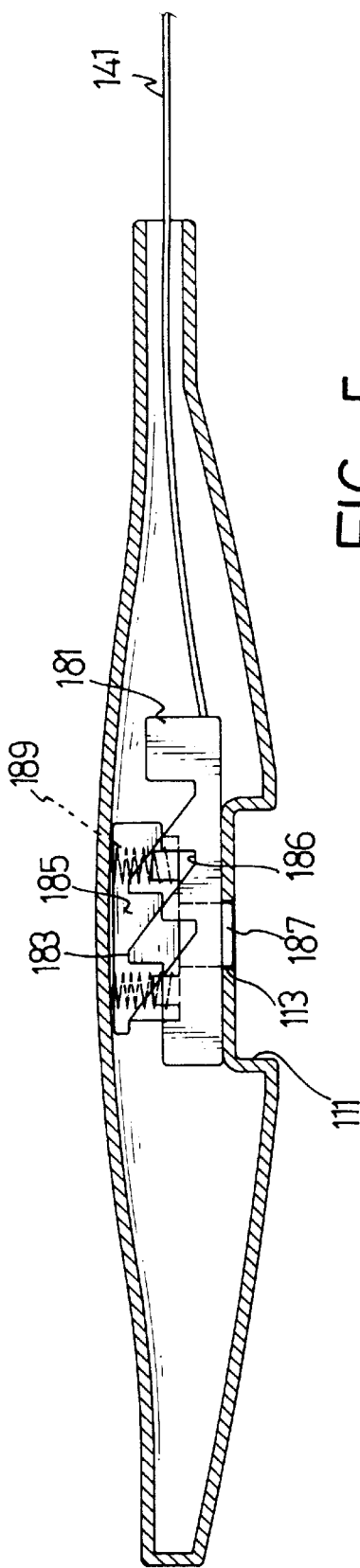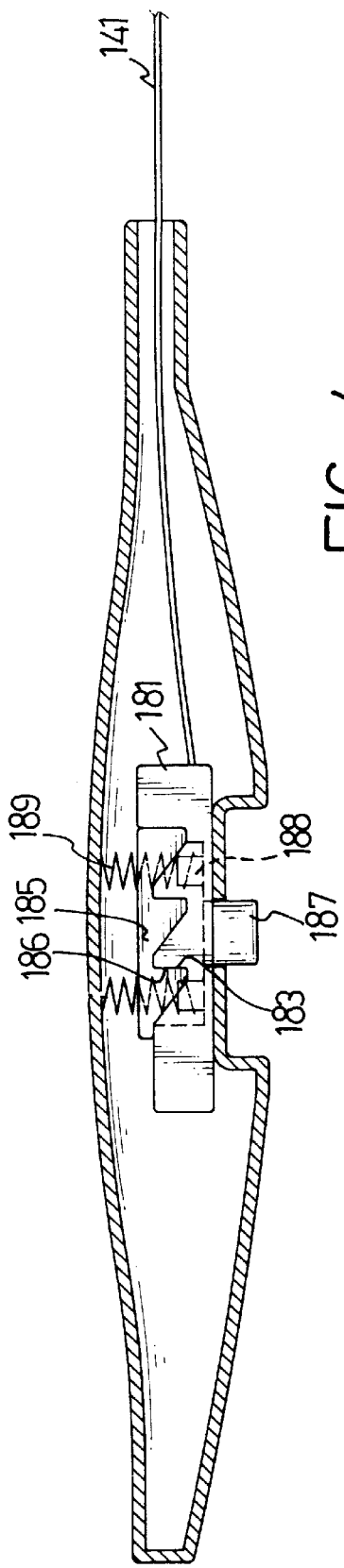

CONTROLLING STRUCTURE OF A STROLLER

FIELD OF THE INVENTION

The present invention generally relates to a controlling structure of a stroller, and more particularly to a controlling structure of a stroller whose seat is able to be released by a user with only one hand to operate the controlling mechanism.

BACKGROUND OF THE INVENTION

Transferring a baby in a stroller, particularly a sleeping baby, and moving it to a car seat or vice versa, may sometimes be a problem to parents, because if the baby is disturbed, it can be very difficult to comfort it or get it back to sleep. To solve the problem, a stroller having a seat releasably attached thereto is introduced to the market. The stroller has a controlling means mounted thereto for controlling the securement of the seat, so that a user is able to release the seat of the stroller by the controlling means, and the sleeping baby will not be bothered. Yet, the controlling means requires the user to use both hands to proceed with the operation of releasing/securing the seat. It is very hard for users to proceed with the operation of releasing/ securing the seat if one of two hands is holding something or the user is disabled. In this case, users will have to secure the seat step by step and one side after another or with the help of others.

From the previous description, the strollers currently available requiring both hands of a user to operate the release of the seat will not fulfill the needs of users)and improvements or alterations thereof are thus required. The stroller having a controlling structure for controlling the release of the seat and constructed in accordance with the present invention tends to mitigate and/or obviate the aforementioned problems.

SUMMARY OF THE INVENTION

The main objective of the invention is to provide a stroller having a controlling structure enabling a user to proceed with the operation of releasing of a seat of the stroller.

Another objective of the invention is to provide a stroller having a controlling structure which comprises a handle, a control bar movably attached to the handle, a pair of wires whose first end is securely received within a receiving portion of a buckling block, a pair of armrests securely mounted onto the stroller, a pair of driving blocks each respectively and securely attached to a second end of the wires and a pair of driven blocks each respectively and slidably received within each of the driving blocks. The driving block is configured to have two opposed open side faces and one side face of which is shaped to have a plurality of teeth respectively disposed on an upper end face and a lower end face. The driven block is configured to have a closed side face having a projection integrally formed thereof and an open side face having a plurality of teeth corresponding to the teeth of the driving block. Furthermore, both of the armrests are configured to have a through hole defined therein, such that when the teeth of the driven block engage with the teeth of the driving block and the projection of the driven block is received within the driving block and extends into the through hole of the armrest, a movement of the driving block will force the driven block to move sideward and thus will result in a retraction of the projection of the driven block from the through hole of the armrest. Due to the linear movement of the projection within the through hole of the armrest, the seat of the stroller is thus able to be released and secured.

Still another objective of the invention is to provide a stroller whose handle together with the control bar are able to be separated from the stroller, so that the shipment volume of the stroller is able to be limited to a minimum.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein;

FIG. 3 is an exploded view showing the configuration features of the armrest, a driving block and a driven block;

FIG. 4 is a cross sectional view showing the disposition relationship of the driving block and the driven block;

FIG. 5 is a further cross sectional view showing the result of the movement of the driving block;

DETAILED DESCRIPTION OF THE PREFERRED EMBODIMENT

Figure 1:
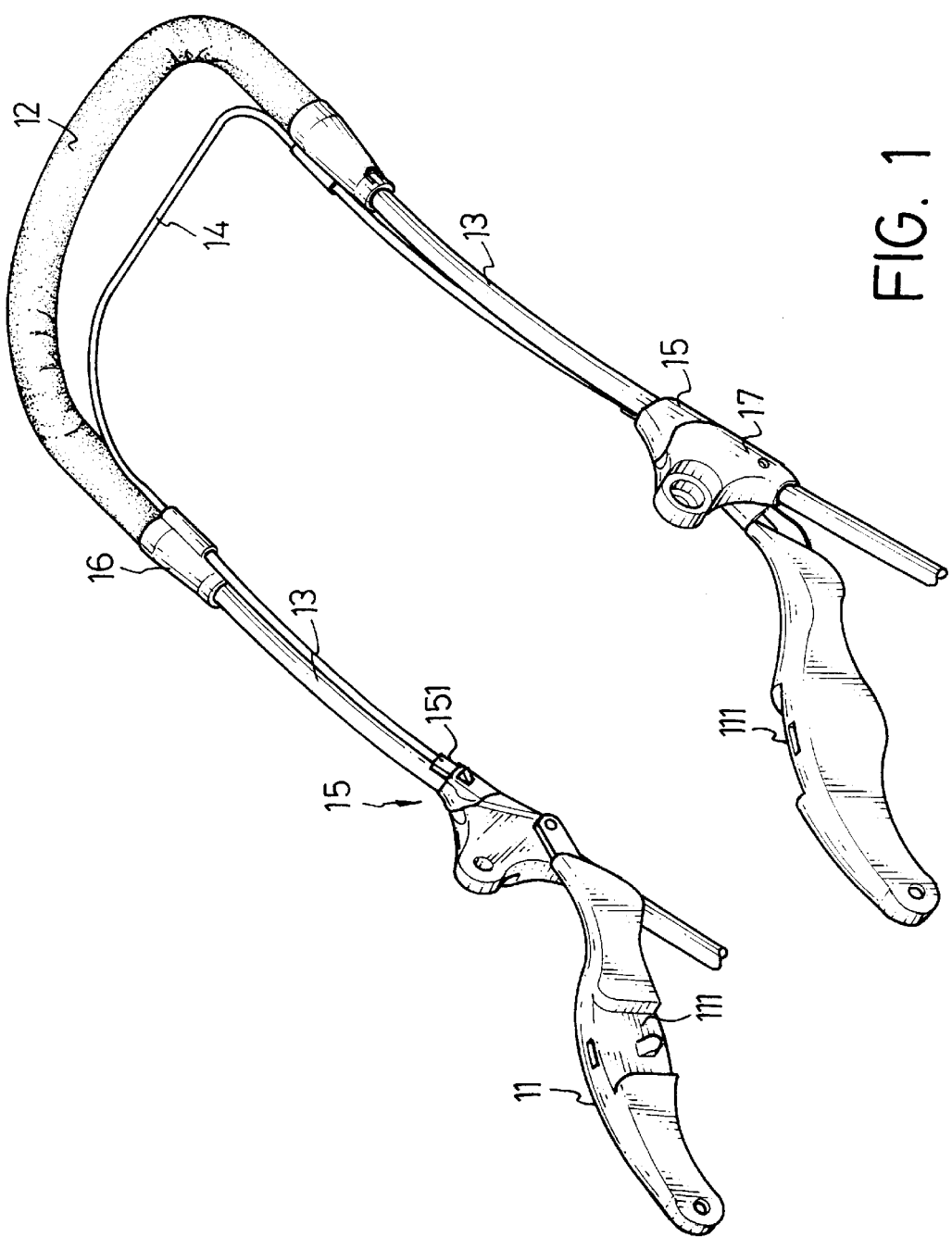
FIG. 1 is a perspective view showing a handle together with a control bar and a pair of armrests configured in accordance with the present invention.
Figure 6:
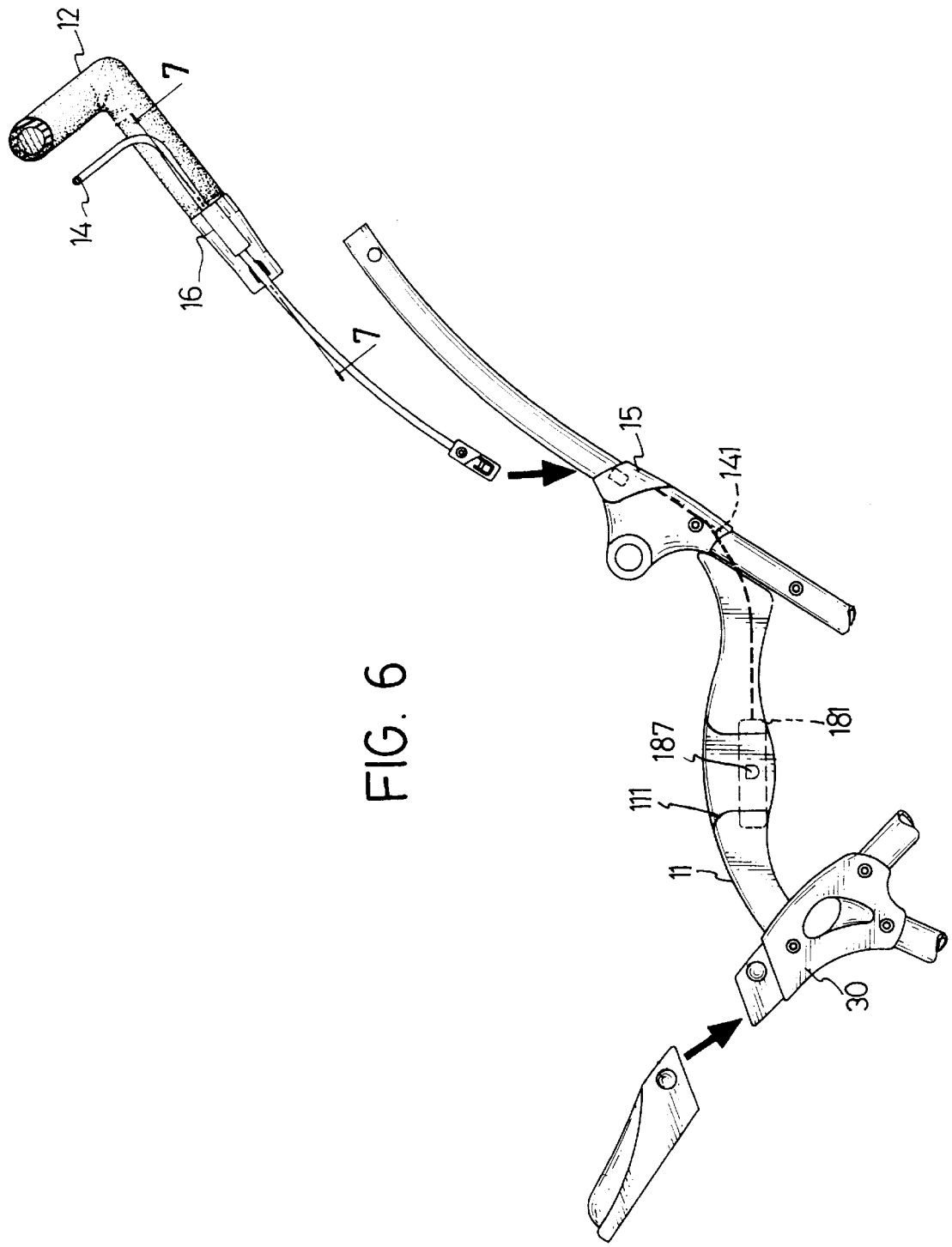
FIG. 6 is a schematic plane view showing the separation of the handle together with the control bar with the stroller.

Referring to FIG. 1, one preferred embodiment of the invention is shown. The controlling structure of a stroller comprises a handle 12, a control bar 14 movably attached to the handle 12 via a pair of connectors 16 respectively secured to the handle 12, a pair of connecting tubes 13 a first end of each which is securely connected with an end of the handle 12 through the respective connector 16, a pair of buckling blocks 15 each slidably receiving the connecting tube 13 therein, a connecting portion 17 adapted to securely engage with the buckling block 15 and a pair of armrests 11, one respective end arm rest being pivotally connected with the connecting portion 17 and the other end of each of the pair of armrests 11 being pivotally connected with a supporting frame 30 as shown in FIG. 6. Still referring to FIG. 1, the pair of armrests 11 each has a saddle 111 defined in a side face thereof and opposed to each other.

Figure 2:
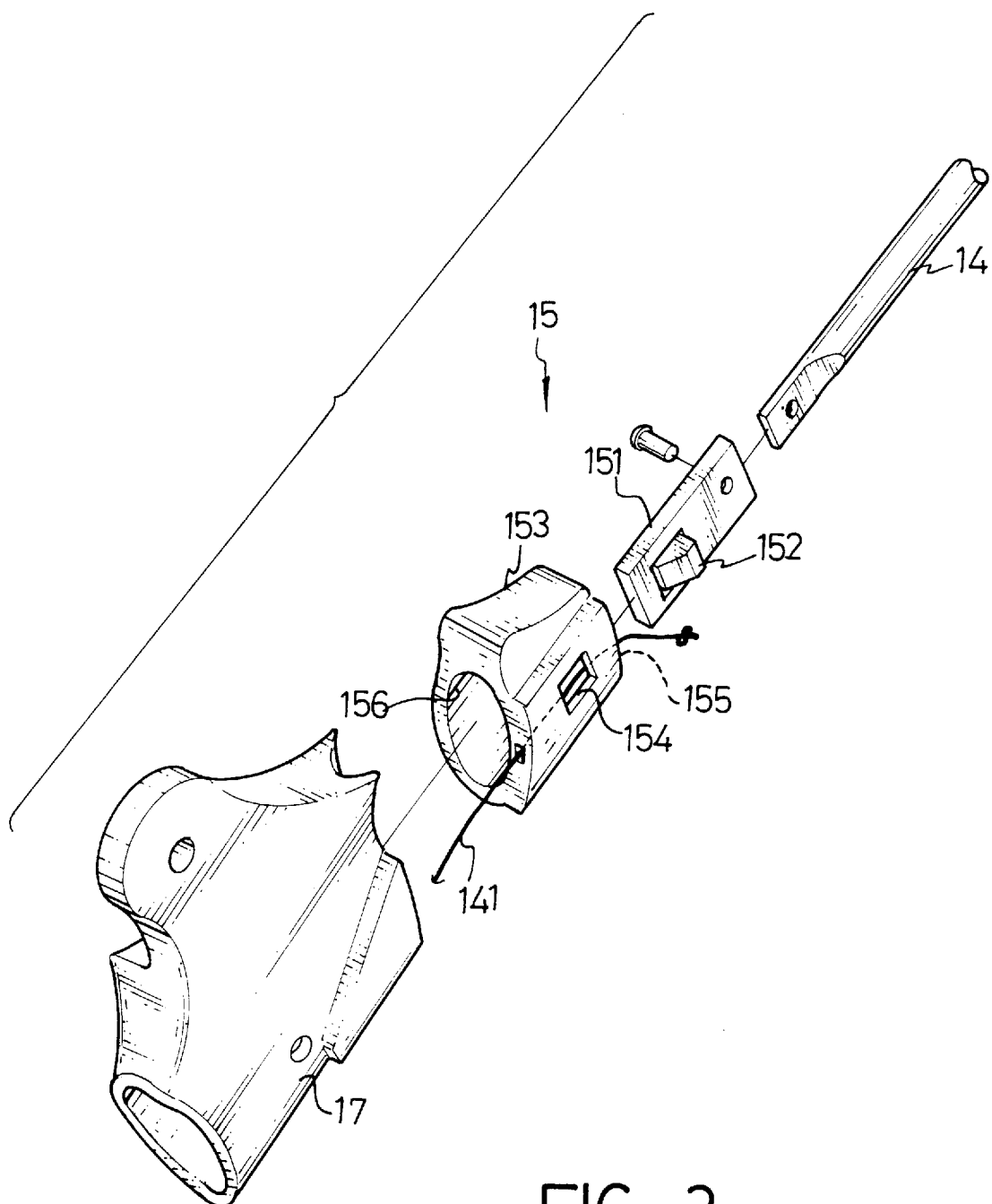
FIG. 2 is an exploded view showing the relationship between the control bar and a buckling block.

FIGS. 2 and 3 show an inner structure of the controlling structure of the present invention. It is to be noted that a respective end of the control bar 14 is securely connected to an end of a connecting plate 151 and a wedge 152 is integrally formed on the connecting plate 151. A channel 156 for receiving the connecting tube 13 and a passage 155 for receiving the connecting plate 151 therein are respectively and axially defined in a receiving portion 153. A side hole 154 defined in the receiving portion 153 and communicating with the passage 155 is provided to receive the wedge 152 of the connecting plate 151 therein, such that when the control bar 14 is securely connected with the connecting plate 151 by means of a rivet (not numbered) and the wedge 152 of the connecting plate 151 is securely received within the side hole 154 of the receiving portion 153, a movement of the control bar 14 will lead the receiving portion 153 to move. Furthermore, an end of a wire 141 is securely received within the passage 155 of the receiving portion 153, so that the movement of the control bar 14 will also cause the wire 141 to move in the direction of the control bar 14. A driving block 181 has two opposed open side faces and a plurality of first teeth 183 are integrally and respectively formed on an upper face thereof and a lower face thereof. A driven block 185 is configured to have a closed side face and an open side face opposed to the closed side face, wherein a plurality of second teeth 186 corresponding to the first teeth 183 of the driving block 181 are respectively formed on an upper end face and a lower end face of the driven block 185. A projection 187 extending to the open side face of the driving block 181 is formed on the closed side face of the driven block 185, and at least one recoil spring 189 is securely disposed within the driven block 185 via at least one post 188 extending opposedly to the extending direction of the projection 187 and formed within the driven block 185. The configuration of the driven block 185 enables it to slide within the driving block 181 with the projection 187 projecting out of the driving block 181. When the driven block 185 is put into a space limiting its axial motion but not its radial motion, and the driving block 181 is put into a space limiting its radial motion but not its axial motion, the movement of the wire 141 will therefore force the driving block 181 to move axially, and the driven block 185 to move radially. That is to say, when the driving block 181 is pulled in a first direction via the wire 141, the driven block 185 moves outward in a second direction perpendicular to the first direction due to the sliding engagement between the first teeth 183 and the second teeth 186. Still referring especially to FIG. 3, a through hole 113 is defined within the saddle 111 of the armrest 11, and is configured to slidably receive the projection 187 of the driven block 185.

FIGS. 4 and 5 show the schematic view of the movement of the driving block 181 and the driven block 185 according to the movement of the driving block 181. When the previously mentioned space is defined within the armrest 11 and the driving block 181 and the driven block 185 are respectively disposed within the space of the armrest 11 with the projection 187 of the driven block 185 extending out of the through hole 113 of the saddle 111, and the recoil spring 189 disposed between the post 188 of the driven block 185 and a side wall of the armrest 11, the movement of the wire 141 will cause the driving block 181 to move axially and in the same direction of the wire 141. Because the radial direction of the driven block 185 is limited and the projection 187 extends into the through hole 113 of the saddle 111 of the armrest 11, and also the correspondingly engaged first teeth 183 and 186 of the driving block 181 and the driven block 185, the movement of the driving block 181 will force the driven block 185 to move radially and thus the projection 187 will retract from the through hole 113. Accordingly, due to the movement of the driven block 185, the recoil spring 189 which provides a recoil force to the driven block 185 when the driving block 181 is back to its original position is in a compressed state.

Figure 7:
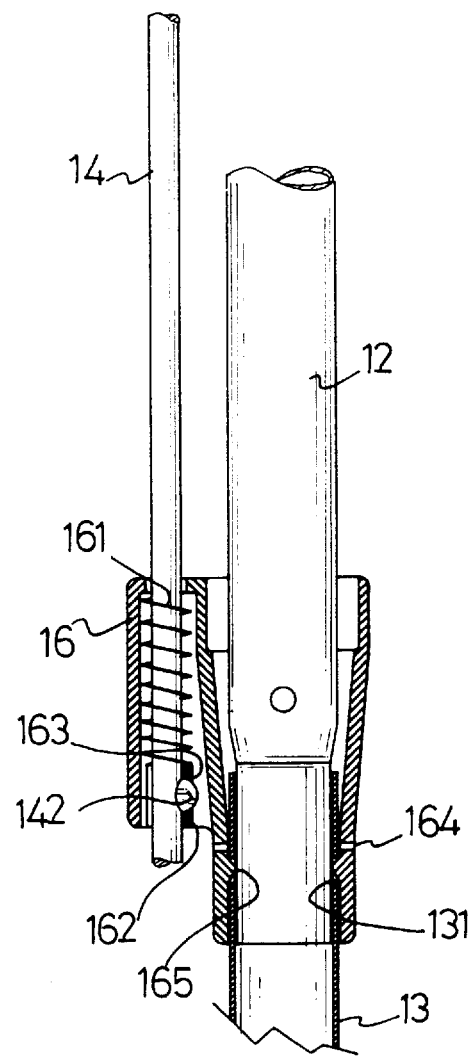
FIG. 7 is a partial cross sectional view of line 7—7 of FIG. 6.

Referring to FIGS. 6 and 7, a spring 161 is provided within the connector 16. One of two ends of the spring 161 abuts an end face within the connector, and the other end of the spring 161 securely engages with a top end of a C ring 162. The control bar 14 further includes a protrusion 142 securely received within the C ring 162, such that when the control bar 14 is pulled by a user, the spring 161 within the connector 16 will provide a recoil force to the control bar 14. In order to occupy less space while in shipment, one side of the connector 16 is provided with a "U" shaped cut 164 and a boss 165 is formed on an inner side of the cut 164, therefore the boss 165 is able to move radially. To cooperate with the boss 165 of the connector 16, a blind hole 131 is defined in the connecting tube 13, such that when the connector 16 is in combination with the connecting tube 13, the boss 165 will be securely disposed within the blind hole 131 of the connecting tube 13.

It is again notable from FIG. 6 that when the driving block 181 and the driven block 185 mated with the driving block 181 through the respective first teeth 183, second teeth 186 are disposed within the previously mentioned space of the armrest 11, the projection 187 extends out of the through hole 113 of the saddle 111. To further reduce the shipment space, a separation between the supporting frame 30 is designed.

Figure 8:
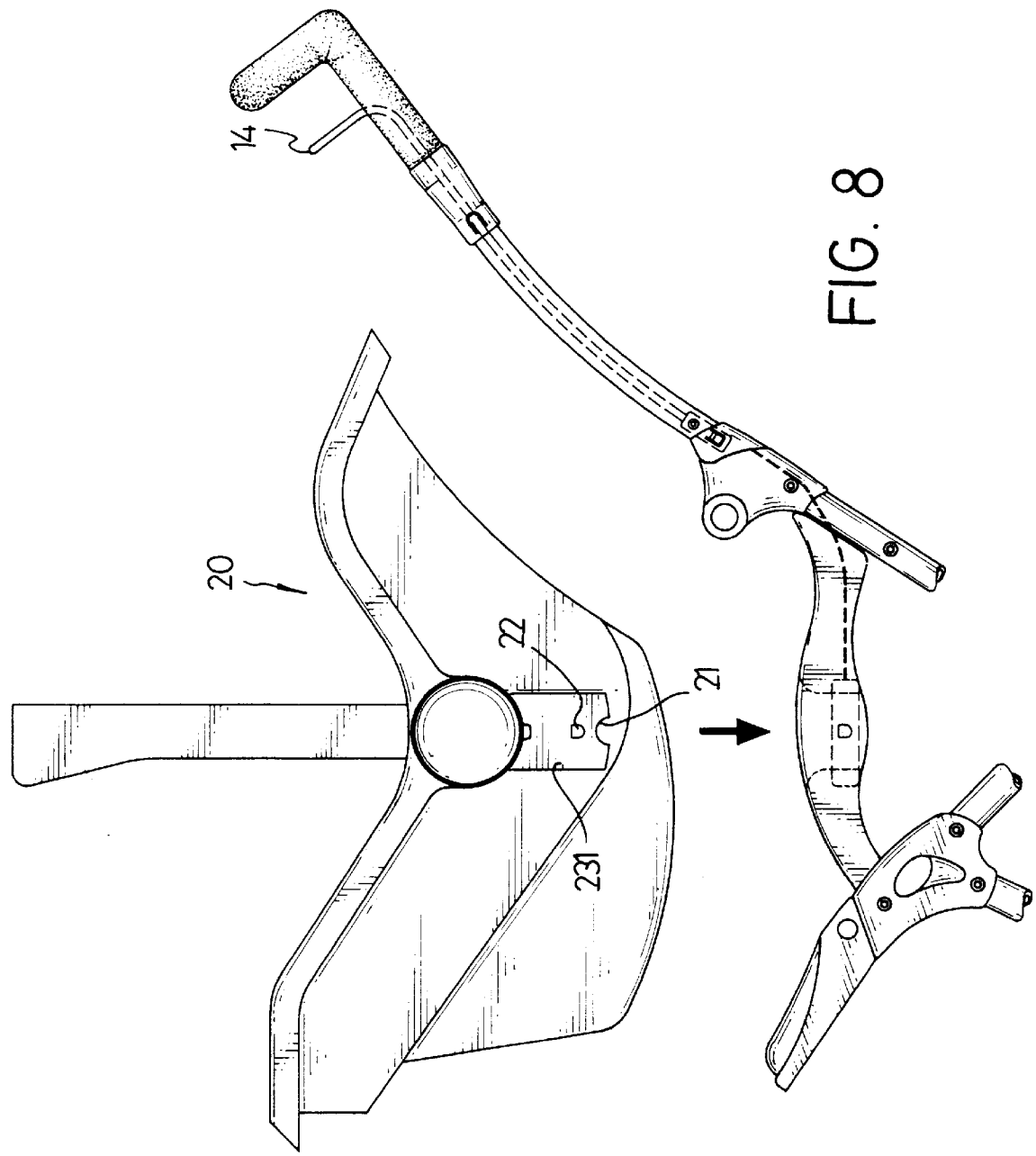
FIGS. 8 and 9 are preferred embodiments showing the combination of a seat with the stroller.
Figure 9:
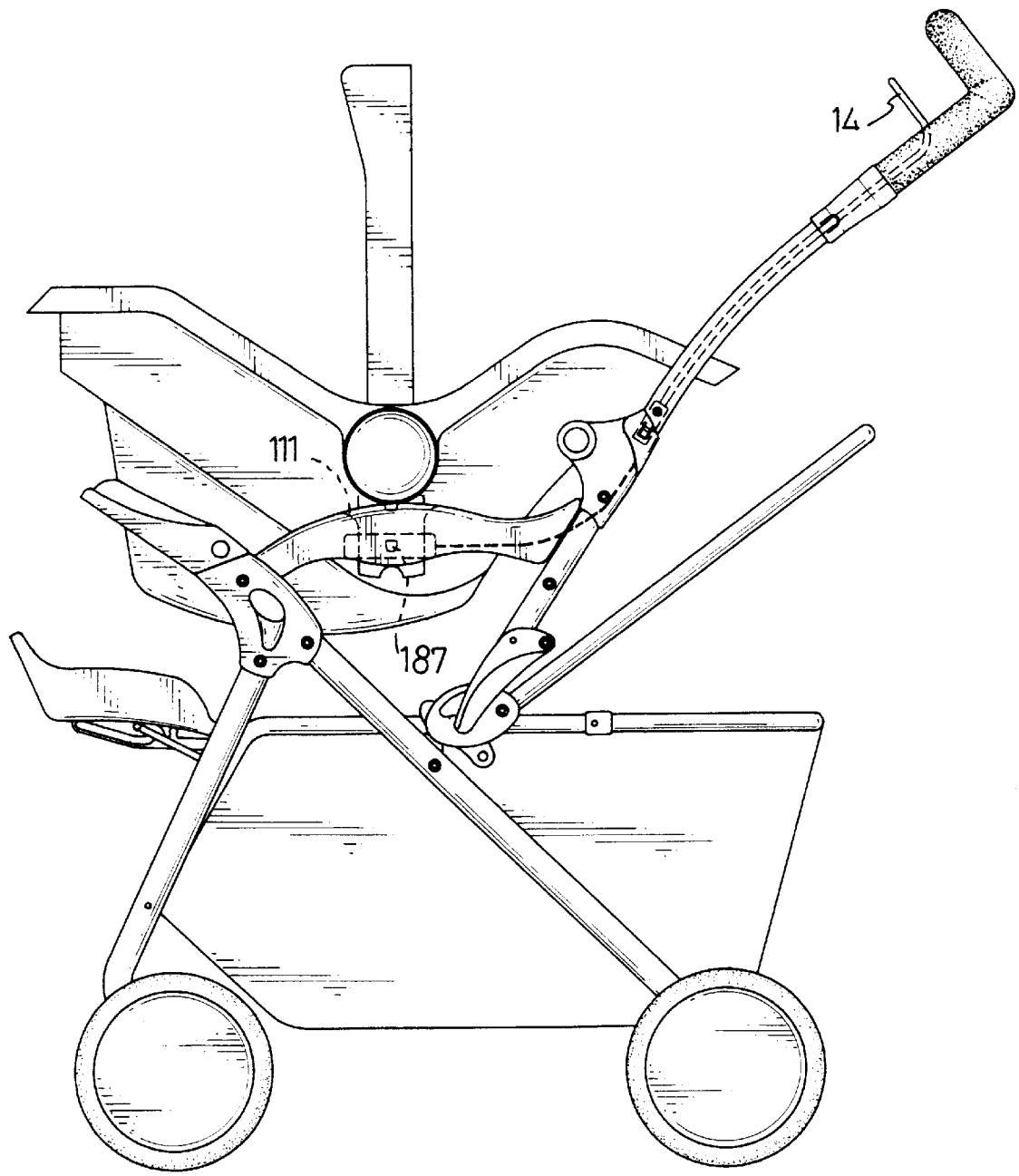

A seat 20, as shown in FIG. 8 and FIG. 9, incorporated with the stroller of the invention is shown. The seat 20 is provided with a holder pivotally connected with the body (not labeled), a side plate 231 having a configuration which fits into the saddle 111 of the armrest 11 and having defined therein a cutout 21 and a hole 22 configured to receive the projection 187 of the driven block 185 therein. Therefore, when the seat 20 is put into the stroller, firstly, the cutout 21 will force the projection 187 of the driven block 185 to leave the through hole 113 of the armrest 11, then due to the provision of the hole 22 and the recoil spring 189, the projection 187 will pop out from the through hole 113 and into the hole 22 of the seat 20. The seat 20 is thus fixed within the stroller of the invention.

To separate the seat 20 from the stroller, a user will only need to pull the control bar 14, then the projections 187 received within the through holes 113 of the saddles 111 of both of the armrests 11 will be forced to leave the through holes 113 of the saddles 111, and then the seat 20 is free to leave the stroller.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A controlling structure of a stroller for releasably connecting a seat having a hole therein, the controlling structure comprising:

a handle;

a connector securely enclosing an end of said handle;

a control bar movably attached to said handle;

a connecting tube whose first end is securely connected with said end of said handle via said connector;

a buckling block securely engaged with an end of said control bar and having a channel defined therein for allowing said connecting tube to extend therethrough;

a wire whose first end is securely attached within said buckling block;

an armrest having a saddle and a through hole defined therein;

a driving block axially received within said armrest and having two opposed side faces and one of said side faces configured to have a plurality of first teeth respectively disposed on an upper end face and a lower end face thereof, said driving block being securely connected with a second end of said wire; and a driven block movably received within said driving block and having a closed side face on which a projection reciprocally and movably received within said through hole of said armrest and said hole of said seat is integrally formed therein and an open side face configured to have a plurality of second teeth corresponding to said first teeth of said driving block and respectively disposed on an upper end face and a lower end face thereof, said driven block being movably engaged with said driving block via respective said teeth engaging with each other, wherein movement of the control bar toward the handle for releasing the seat from the controlling structure.

2. The controlling structure as claimed in claim 1, wherein said buckling block further comprises a connecting plate securely connected with said control bar via an end thereof and having a wedge integrally formed thereon; and a receiving portion defining therein a channel allowing said connecting tube to be inserted therethrough, a passage configured to allow said connecting plate to be inserted therethrough and a side hole communicating with said passage and configured to securely retain said wedge of said connecting plate therein.

3. The controlling structure as claimed in claim 1, wherein said driven block further comprises at least one post integrally formed therein, so that at least one recoil spring is able to be abutted between said post and an inner wall of said armrest.

4. The controlling structure as claimed in claim 1 further comprising the seat wherein said seat is configured to have a cutout adapted to correspond to said projection of said driven block and said hole in said seat configured to receive said projection therein.

* * * * *